United States Patent Office 3,113,940
Patented Dec. 10, 1963

3,113,940
AROMATIC PARTIAL ETHERS OF TRIS(2-HYDROXYPHENYL)TRIAZINE
Iral B. Johns, Marblehead, and Harry R. Di Pietro, Watertown, Mass., assignors to Monsanto Research Corporation, St. Louis, Mo., a corporation of Delaware
No Drawing. Filed July 13, 1961, Ser. No. 123,640
6 Claims. (Cl. 260—248)

This invention relates to aromatic, nitrogenous ethers and more particularly relates to ethers of hydroxyaryl-substituted triazines and to methods of preparing the same.

According to the invention, there are provided new and valuable aromatic, mono- and di-ethers by the reaction of an alkali metal salt of a 2,4,6-tris(2-hydroxyaryl)-s-triazine with a nuclearly monohalogenated benzenoid compound, the reaction proceeding as follows for the preparation of the diethers:

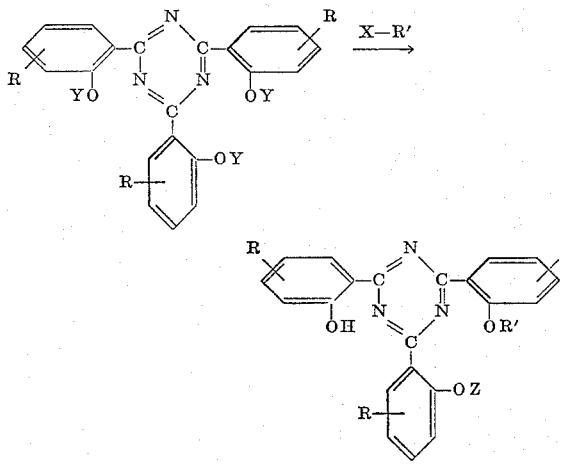

wherein R is selected from the class consisting of hydrogen and alkyl radicals of from 1 to 5 carbon atoms, R' is selected from the class consisting of the phenyl radical, the phenoxyphenyl radical and such radicals carrying alkyl-substitution wherein the alkyl radical has from 1 to 5 carbon atoms, Z is selected from the class consisting of hydrogen and R', and X is selected from the class consisting of chlorine, bromine, and iodine and is attached to a nuclear carbon atom of R', Y is alkali metal.

Depending upon the availability of halogenated aromatic compound which is employed, from 1 to 2 of the hydroxy radicals of the 2,4,6-tris(2-hydroxyaryl)-s-triazine are etherified. There are thus formed the bis(2-etheraryl)-2-hydroxyaryl-s-triazines, or the 2-etheraryl-bis(2-hydroxyaryl)-s-triazines. Compounds of the following general formula are thus provided by the invention:

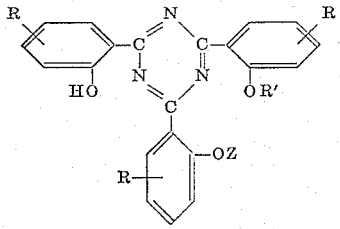

in which R and R' are as above defined, and Z is selected from the class consisting of hydrogen and R'.

The tris(2-hydroxyaryl)-s-triazines which are employed as starting materials are readily obtainable by the trimerization of the nitrile or amide of an o-hydroxy-substituted aromatic monocarboxylic acid. For example, as described by Cousin and Volmar, Bull. Soc. Chim. (4), 15, 416 (1914), upon heating salicylamide at 260–270° C., 2,4,6-tris(2-hydroxyphenyl)-s-triazine is obtained. The alkyl-substituted salicylamides are similarly converted to the 2,4,6-tris(alkyl-2-hydroxyphenyl)-s-triazines, e.g., trimerization of 2,3-, 2,4-, 2,5- or 2,6-cresotamide yields 2,4,6-tris(3-or 4- or 5- or 6-methyl-2-hydroxyphenyl)-s-triazine and similarly the trimerization of 3-, 4-, 5- or 6-ethylsalicylamide yields 2,4,6-tris(3-, 4-, 5-, or 6-ethyl-2-hydroxyphenyl)-s-triazine.

The nuclearly monohalogenated benzoid compound which is employed for the etherification of the 2,4,6-tris(2-hydroxyaryl)-s-triazine may be a bromo-, chloro- or iodobenzene or alkylbenzene having from 1 to 5 carbon atoms in the alkyl radical, e.g., iodobenzene, chlorobenzene, 4-bromocumene, 4-bromoethylbenzene, 3-bromoethylbenzene, 4-bromopentylbenzene, 3-iodobutylbenzene, etc. The nuclearly halogenated aromatic compound may be also a halophenyl phenyl ether or an alkyl derivative thereof having from 1 to 5 carbon atoms in the alkyl radical, e.g., 4-iodophenyl phenyl ether, 4-bromophenyl p-tolyl ether, 3-bromo-4-ethylphenyl 4-ethylphenyl ether, 5-bromo-2-isopropylphenyl phenyl ether, 4-iodo-3-pentylphenyl 3-pentylphenyl ether, etc.

Examples of the benzenoid ethers provided by the invention are 2,4-bis(4-methyl-2-phenoxyphenyl)-6-(2-hydroxy 4-methylphenyl)-s-triazine which is obtained by reaction of 2 moles of iodobenzene with 1 mole of the trisodium salt of 2,4,6-tris(2-hydroxy-4-methylphenyl)-s-triazine; 2,4-bis(2-p-tolyloxyphenyl)-6-(2-hydroxyphenyl)-s-triazine by reaction of 2 moles of p-bromotoluene with 1 mole of the tripotassium salt of 2,4,6-tris(2-hydroxyphenyl)-s-triazine; 2-(2-o-pentylphenoxyphenyl)-4,6-bis(2-hydroxyphenyl)-s-triazine by reaction of 1 mole of o-iodopentylbenzene with 1 mole of the trilithium salt of 2,4,6-tris(2-hydroxyphenyl)-s-triazine; 2,4-bis[2-(4-phenoxyphenoxy)-3-n-pentylphenyl] 6-(2-hydroxy-3-n-pentylphenyl)-s-triazine from 2 moles of 4-chlorophenyl phenyl ether and 1 mole of the tripotassium salt of 2,4,6-tris(3-n-pentyl-2-hydroxyphenyl)-s-triazine; 2,4-bis(2-hydroxyphenyl)-6-[2-(4 - phenoxyphenoxy)phenyl]-s-triazine from 1 mole of 4-iodophenyl phenyl ether and 1 mole of the tripotassium salt of 2,4,6-tris(2-hydroxyphenyl)-s-triazine; 2,4-bis(2-hydroxy-3-ethylphenyl)-6-[2-(4-phenoxyphenoxy)-3-ethylphenyl]-s-triazine from 1 mole of 4-bromophenyl phenyl ether and 1 mole of the trilithium salt of 2,4,6-tris(2-hydroxy-3-ethylphenyl)-s-triazine; 2,4-bis(2-hydroxyphenyl)-6-(2 - phenoxyphenyl)-s-triazine from 1 mole of bromobenzene and 1 mole of the tripotassium salt of 2,4,6-tris(2-hydroxyphenyl)-s-triazine, etc.

Reaction of the alkali metal salt of the 2,4,6-tris,2-hydroxyaryl)-s-triazine with the nuclearly halogenated aromatic compound takes place readily by heating the halogenated compound with said salt at a temperature of, say, from 150 to 240° C. and in the presence of an inert diluent or solvent and a copper catalyst, e.g., metallic copper, which may be finely comminuted, and copper salts such as cupric or cuprous iodide, chloride, bromide, etc.

Since formation of the ethers proceeds by reaction of one or two moles of the halogen compound with one or two of the hydroxy radicals of the tris(hydroxyaryl)-s-triazine, the two reactants are advantageously employed in such stoichiometric proportions, although in many instances, particularly when an excess of the halogenated compound is used per mole of the triazine compound, there are formed products of various degree of etherification. The reaction is not conducive, however, to the formation of the tri-ethers. Generally, in order to obtain the diethers, there should be employed, of course, two moles of the halogen compound per mole of the triazine; however, the use of a substantial excess of the halogenated compound over this ratio also results in the diether. Even in a 3:1 molar ratio of halogenated compound to the hydroxy triazine, there will be present in the reaction mixture minor amounts of mono-etherification product together with the diether, particularly if the reaction is interrupted before all of the available halogen component has had opportunity to participate in the di-etherification. The extent and completion of the reaction can be ascertained by noting the cessation of change in the refractive index and/or in the temperature of the reaction mixture or by sampling the reaction mixture for content of unreacted halogenated compound. When the mono-ether, rather than the diether, is the desired end product, use of less than the 2:1 molar ratio of halogenated compound to triazine compound is recommended. Since the second hydroxyl radical appears to be as readily etherified as the first hydroxyl radical, when preparing the monoetherified tris(hydroxyaryl)-s-triazines, the product is usually a mixture of the mono-ether and the diether. To obtain a preponderance of the mono-etherification product, it is advisable to mitigate reaction rate, e.g., by employing a large quantity of diluent, and/or by operating at lower temperatures than those generally employed for dietherification.

The two different types of etherification products, i.e., the mono-, and diethers are readily separated from each other when they are present together in the reaction mixture, using isolating procedures known to those skilled in the art, e.g., solvent extraction, fractional crystallization, etc.

The presence of an inert diluent or solvent is advantageous on obtaining smooth reaction and avoiding side-reactions, e.g., polymerization. Inert liquid diluents which are useful for the present purpose are polar solvents, generally, e.g., dioxane, morpholine, pyridine, dimethylformamide, dimethylsulfoxide, the lower alkyl ethers of ethylene glycol or diethylene glycol, etc., as well as the non-polar liquids such as nitrobenzene and high-boiling hydrocarbons, which materials while not being solvents for the tris(hydroxyaryl)-s-triazines are useful in serving to facilitate uniform distribution of the reactants throughout the reaction mixture by suspension.

The reaction results in the production of alkali metal halide as by-product. This may be readily removed from the reaction product by water-washing and/or filtration. Any unreacted halogenated compound or triazine as well as the diluent, may be removed by distillation, or the desired ether product may be obtained from the reaction mixture by solvent-extraction, fractional crystallization, etc.

The presently provided aromatic mono- and diethers of the 2,4,6-tris(2-hydroxyphenyl)-s-triazines are stable, well-characterized compounds which are generally waxy to crystalline solids or viscous liquids. They are advantageously employed for a variety of industrial purposes, e.g., as plasticizers for synthetic resins and plastics, as antioxidants and curing aids in the manufacture of natural and synthetic rubber products, and as gasoline and hydrocarbon oil lubricants. As disclosed in our copending application, Serial No. 123,637, filed of even date, the presently provided ethers are valuable as starting materials for the synthesis of coordination compounds with bivalent tetracoordinate metals, e.g., cobalt, nickel, lead, beryllium, zinc and copper, which coordination compounds are generally high-melting, moldable and extrudable polymeric solids.

The invention is further illustrated by, but not limited to, the following examples.

*Example 1*

The tripotassium salt of 2,4,6-tris(2-hydroxyphenyl)-s-triazine was prepared by heating a mixture of 18 g. of said hydroxy compound and 10 g. of 85% potassium hydroxide pellets in 150 ml. of toluene until water was no longer given off. Removal of the toluene by distillation gave as residue the substantially pure tripotassium salt.

Powdered copper, to be employed as catalyst for reaction of the tripotassium salt with bromobenzene, was prepared as follows: A slightly acidified solution of copper sulfate was treated with oxide-free zinc dust while maintaining the temperature at below 40° C., the copper thus precipitated was collected, washed acid-free with water and then with acetone, and finally dried at about 100° C., substantially as described by P. H. Gore and G. K. Hughes, J. Chem. Soc. (1959), 1615.

A mixture consisting of the above-prepared tripotassium salt of 2,4,6-tris(2-hydroxyphenyl)-s-triazine, 50 ml. of diglyme solvent (the dimethyl ether of diethylene glycol) and 18 g. of the above-prepared copper catalyst was heated under nitrogen to 175°–180° C. To the heated mixture, there was added, dropwise, 40 g. of bromobenzene, and after the addition had been completed, the whole was heated for 5 hours at 170–180° C. After cooling, the reaction mixture was diluted with toluene, filtered, and the filtered solids extracted with hot toluene. The filtrate and extracts were combined, treated with dilute hydrochloric acid to precipitate any unreacted starting material, and filtered. After washing the filtrate with water, drying over magnesium sulfate and evaporating the solvent, there was obtained as residue a tan solid, M.P. 157–160° C. This was recrystallized, first from acetone-methanol and then from acetone to give the substantially pure 2,4-bis(2-phenoxyphenyl)-6-(2-hydroxyphenyl)-s-triazine, M.P. 160–162° C., and analyzing as follows:

|  | Found | Calcd. for $C_{33}H_{23}O_3N$ |
|---|---|---|
| Percent C | 77.59 | 77.79 |
| Percent H | 4.95 | 4.55 |
| Percent N | 8.48 | 8.25 |

*Example 2*

A mixture of 18 g. of 2,4,6-tris(2-hydroxyphenyl)-s-triazine and 10 g. of 85% potassium hydroxide pellets in 75 ml. of toluene was heated until no more water was removed. The toluene was distilled and the reaction mixture heated for 3 hours under vacuum to assure complete removal of water. After addition of 2 g. of the dry copper catalyst described in Example 1, the reaction mixture was heated to 150° C., and there was added thereto 61 g. of p-bromophenyl phenyl ether during a time of one hour. The whole was then heated for 5.5 hours under nitrogen at 225–250° C. (oil bath temperature). The reaction mixture was then allowed to attain room temperature, diluted with benzene-petroleum ether, and allowed to stand for about two days. At the end of that time the reaction mixture was filtered, and the filtrate was washed with dilute hydrochloric acid, dried over magnesium sulfate and distilled to remove material boiling below 143° C./3.3 mm. The residue, comprising the etherified product, was dissolved in acetone. Addition of methanol to the resulting solution caused stratification into an oil and a supernatant, creamy layer, which was decanted. The oil was dissolved in hot acetone and cooled to give a solid which upon recrystallization from ethyl methyl ketone gave the substantially pure 2,4-bis[2-(4-phenoxyphenoxy)phenyl]-6-(2 - hydroxyphenyl)-s-triazine, M.P. 145–146° C. (uncorrected), and analyzing as follows:

|  | Found | Calcd. for $C_{45}H_{31}O_5N_3$ |
|---|---|---|
| Percent C | 77.23 | 77.91 |
| Percent H | 4.51 | 4.50 |
| Percent N | 6.10 | 6.06 |

What we claim is:
1. A compound of the formula

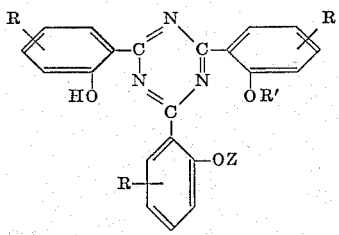

in which R is selected from the class consisting of hydrogen and alkyl of from 1 to 5 carbon atoms, R' is selected from the class consisting of phenyl, phenoxyphenyl, alkyl-substituted phenyl and alkyl-substituted phenoxyphenyl wherein alkyl has from 1 to 5 carbon atoms, and Z is selected from the class consisting of hydrogen and R'.

2. A compound of the formula

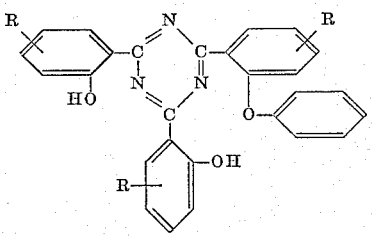

in which R is alkyl of from 1 to 5 carbon atoms.

3. A compound of the formula

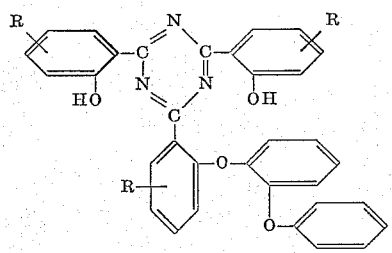

in which R is alkyl of from 1 to 5 carbon atoms.

4. 2,4-bis(2-phenoxyphenyl)-6-(2-hydroxyphenyl)-s-triazine.

5. 2,4-bis[2-(4-phenoxyphenoxy)phenyl]-6-(2-hydroxyphenyl)-s-triazine.

6. 2,4 - bis(2 - hydroxyphenyl)-6-[2-(4 - phenoxy - phenoxy)phenyl]-s-triazine.

References Cited in the file of this patent

Cousin et al.: "Bull. Soc. Chim." (4), vol. 15, pages 416, 417 (1914).

Weygand: "Organic Preparations," Interscience Pub. Inc., 1945, page 165.